United States Patent
Giusti et al.

(10) Patent No.: US 12,467,812 B2
(45) Date of Patent: Nov. 11, 2025

(54) PACKAGED PRESSURE SENSOR DEVICE AND CORRESPONDING METHOD FOR DETECTING THE PRESENCE OF FOREIGN MATERIAL

(71) Applicant: STMICROELECTRONICS S.r.l., Agrate Brianza (IT)

(72) Inventors: Domenico Giusti, Caponago (IT); Enri Duqi, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 361 days.

(21) Appl. No.: 18/171,163

(22) Filed: Feb. 17, 2023

(65) Prior Publication Data
US 2023/0273084 A1 Aug. 31, 2023

(30) Foreign Application Priority Data
Feb. 28, 2022 (IT) .......................... 102022000003695

(51) Int. Cl.
*G01L 9/00* (2006.01)
*G01L 19/14* (2006.01)
*G01L 27/00* (2006.01)

(52) U.S. Cl.
CPC .......... *G01L 9/0054* (2013.01); *G01L 19/147* (2013.01); *G01L 19/148* (2013.01); *G01L 27/007* (2013.01)

(58) Field of Classification Search
None
See application file for complete search history.

(56) References Cited

U.S. PATENT DOCUMENTS

| 8,476,087 B2* | 7/2013 | Hooper ................. G01L 19/148 |
| | | 438/17 |
| 9,772,314 B2* | 9/2017 | Kojima ................. G10K 11/28 |
| 10,203,255 B2* | 2/2019 | Wagner ................. G01L 27/002 |

(Continued)

FOREIGN PATENT DOCUMENTS

| CN | 104340949 A | 2/2015 |
| CN | 105806539 A | 7/2016 |

(Continued)

*Primary Examiner* — Peter J Macchiarolo
*Assistant Examiner* — Jermaine L Jenkins
(74) *Attorney, Agent, or Firm* — Seed IP Law Group LLP

(57) ABSTRACT

A pressure sensor device has: a pressure detection structure provided in a first die of semiconductor material; a package, configured to internally accommodate the pressure detection structure in an impermeable manner, the package having a base structure and a body structure, arranged on the base structure, with an access opening in contact with an external environment and internally defining a housing cavity, in which the first die is arranged covered with a coating material. A piezoelectric transduction structure, of a ultrasonic type, is accommodated in the housing cavity, in order to allow detection of foreign material above the coating material and within the package. In particular, the piezoelectric transduction structure is integrated in the first die, which comprises a first portion, wherein the pressure detection structure is integrated, and a second portion, separate and distinct from the first portion, wherein the piezoelectric transduction structure is integrated.

20 Claims, 7 Drawing Sheets

(56) References Cited

U.S. PATENT DOCUMENTS

| | | | |
|---|---|---|---|
| 11,199,463 B2* | 12/2021 | Rajaraman | G01L 19/0645 |
| 2010/0284553 A1 | 11/2010 | Conti et al. | |
| 2015/0369681 A1* | 12/2015 | Imai | G01L 19/145 |
| | | | 73/727 |
| 2015/0369682 A1* | 12/2015 | Nakajima | G01L 19/143 |
| | | | 73/384 |
| 2016/0084722 A1* | 3/2016 | Hooper | G01L 19/069 |
| | | | 29/825 |
| 2016/0209285 A1 | 7/2016 | Nakajima | |
| 2017/0089789 A1* | 3/2017 | Kanemoto | G01L 19/02 |
| 2018/0313709 A1 | 11/2018 | Chiou | |
| 2019/0207582 A1 | 7/2019 | Wainerdi et al. | |
| 2020/0321286 A1 | 10/2020 | Hooper et al. | |
| 2020/0357715 A1 | 11/2020 | Vincent | |

FOREIGN PATENT DOCUMENTS

| | | |
|---|---|---|
| CN | 105847475 A | 8/2016 |
| CN | 107445133 A | 12/2017 |
| CN | 109863394 A | 6/2019 |
| CN | 110180770 A | 8/2019 |
| CN | 110608842 A | 12/2019 |
| CN | 112674390 A | 4/2021 |
| WO | WO 2012009550 A2 | 1/2012 |

* cited by examiner

PACKAGED PRESSURE SENSOR DEVICE AND CORRESPONDING METHOD FOR DETECTING THE PRESENCE OF FOREIGN MATERIAL

BACKGROUND

Technical Field

The present disclosure relates to a packaged pressure sensor device and to a method for detecting the presence of foreign material within a corresponding package.

Description of the Related Art

Microelectromechanical (so-called MEMS-Micro Electro Mechanical System) pressure sensors (or barometers) are known of impermeable or hermetic type or in any case resistant to water (so-called "waterproof").

These pressure sensors may be used in portable or wearable electronic apparatuses, such as smartphones, smartbands or smartwatches, which may be used for underwater applications or in general inside the water.

These pressure sensors typically comprise a detection structure having a membrane suspended above a cavity and in which detection elements (for example piezoresistors) are provided to detect the deformation caused by impinging pressure waves.

The detection structure is integrated within a package, usually together with a corresponding signal reading and processing electronics, provided as an ASIC (Application Specific Integrated Circuit), which provides a pressure signal indicative of the detected pressure.

The aforementioned package has an inlet opening, to allow the detection of the external pressure, and internally defines a cavity wherein the aforementioned detection structure and the associated ASIC are accommodated.

Typically, this cavity is filled with a protective material, such as a coating gel (so-called "potting gel"), which coats and protects the detection structure and the ASIC for example from contaminants, dust, chemicals, fluids (in particular water), coming from the external environment. Only this protective material is in contact with the external environment, effectively making the cavity (filled with the same protective material) impermeable or hermetic.

In addition to detecting the pressure value (and possibly an associated altitude value), the pressure sensor may be used, by a processing module (possibly integrated in the aforementioned ASIC and provided, for example, with an artificial intelligence processing core), for the recognition of activities performed by the user of the portable or wearable electronic apparatus. By way of example, some activities that may be detected, by recognizing corresponding patterns in the pressure signal, include: user's steps; weight lifting; use of an elevator; use of a bicycle; swimming (or snorkeling).

While using the pressure sensor, water or other liquids (such as sweat, rain, etc.) may enter the cavity from the aforementioned access opening, coming into contact with the protective material. In general, any material that is foreign to the pressure sensor may enter the package, for example including contaminating particles or the like.

The pressure signal provided by the pressure sensor may be affected by the presence of this foreign material; for example in case of water (more generally of liquid), the detected signal cannot be correctly used, for example for the recognition of activities, up to the evaporation of the same water; the presence of water may in fact modify the pressure detection due to different environmental factors, the evaporation rate, the surface tension, etc.

For example, the pressure signal may vary more slowly, thus delaying the time after which the pattern recognition may be used to detect the user activity.

It is also known that some pressure sensors may have a double full scale, a first full scale for detecting the environmental pressure (or barometric pressure, for example for monitoring altitude or elevation) and a second (higher) full scale for detecting the pressures occurring inside the water (e.g., for depth monitoring).

In these pressure sensors, an automatic detection of the insertion inside the water (i.e., of the operating environment variation, from the external environment, air, to the in-water or underwater environment) may be implemented, in order to automatically activate/deactivate some specific functions and, in particular, to automatically vary the full scale value used for pressure detection. In this regard, the full scale change may be implemented by a suitable adjustment of the gain factors of the reading electronics associated with the pressure detection.

The automatic detection of the operating environment variation is generally implemented exclusively, or mainly, as a function of the detected pressure value. For example, the pressure sensor full-scale automatic variation may be implemented in case the detected pressure value exceeds a certain threshold that is higher than air or barometric pressure (in this case activating an higher full scale), or is below a certain threshold that is lower than the same barometric pressure (in this case activating a lower full scale), for a set time interval.

In general, however, it has been observed that currently used solutions do not allow to cover all the possible cases of use in the aforementioned automatic recognition of operating environment variation. For example, a slow introduction into the water of the electronic apparatus (e.g., a smartwatch) in which the pressure sensor is integrated might not be correctly detected.

In general, the possibility exists for errors (so-called "false positives") to occur in detecting the operating environment variation, as different events may in principle cause a pressure variation that may be incorrectly interpreted as an operating environment change.

For example, in the case of wearable electronic apparatuses, a false positive in detecting the introduction into the water may cause a variation, in this case undesired, in the pressure sensor full scale, when the electronic apparatus is actually still operative in air and/or may cause some functions of the apparatuses to be erroneously disabled.

BRIEF SUMMARY

The present disclosure is, in general, directed to overcome the drawbacks of the known solutions previously highlighted.

According to the present disclosure, therefore, a pressure sensor device and a corresponding method for detecting the presence of foreign material are provided.

In at least one embodiment of a pressure sensor device of the present disclosure includes: a pressure detection structure provided in a first die of semiconductor material; a package, configured to internally accommodate said pressure detection structure in an impermeable manner, the package comprising a base structure and a body structure, arranged on the base structure, having an access opening in contact with an external environment and internally defining a housing cavity, in which said first die is arranged covered by a coating material, including, accommodated in said housing cavity, a piezoelectric transduction structure, of a ultrasonic type, configured to allow detection of foreign material on said coating material within said package.

BRIEF DESCRIPTION OF THE SEVERAL VIEWS OF THE DRAWINGS

For a better understanding of the disclosure, embodiments thereof are now described, purely by way of non-limiting example and with reference to the attached drawings, wherein.

DETAILED DESCRIPTION

Figure 1:
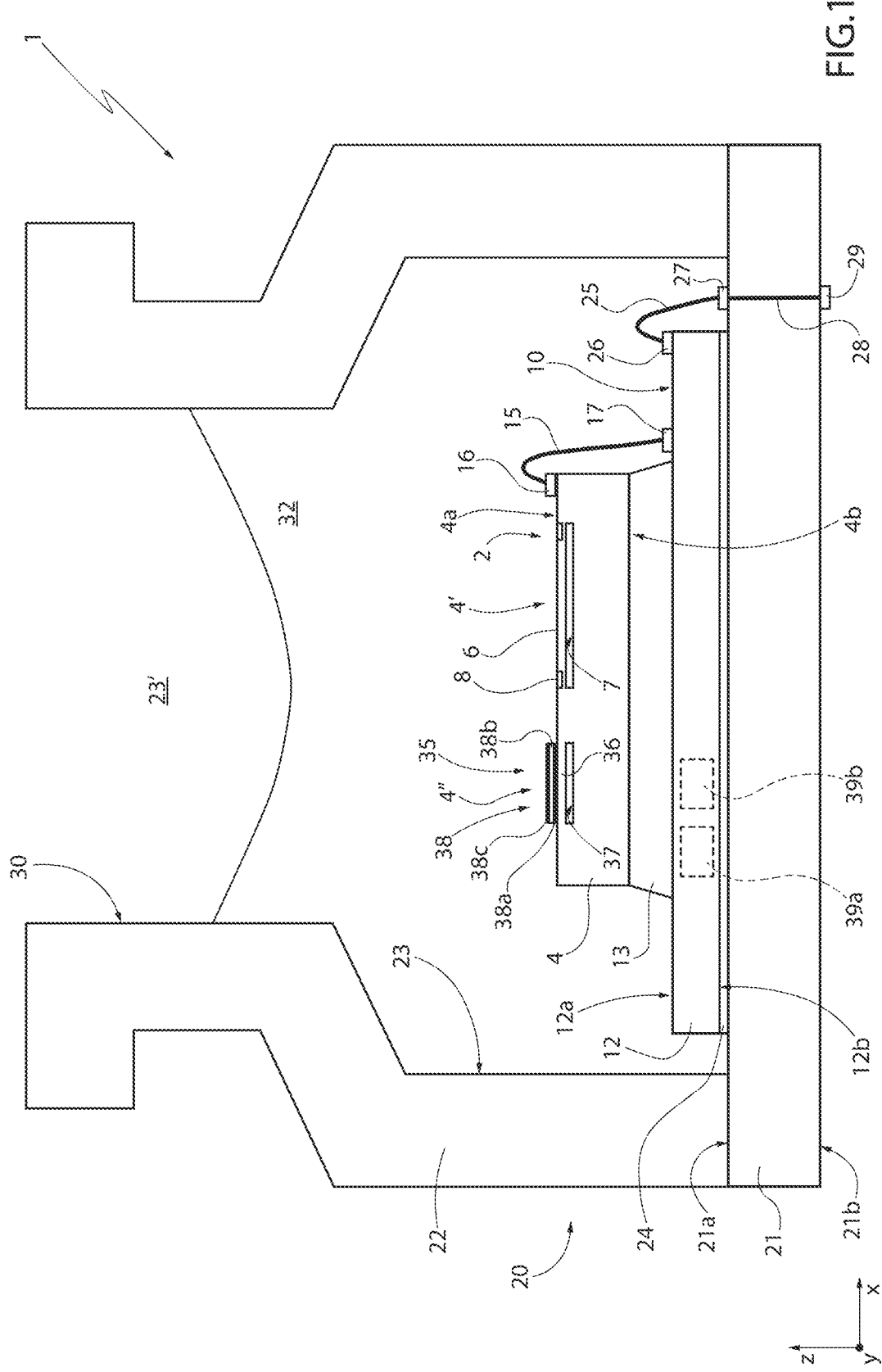
FIG. 1 illustrates a schematic cross-section of a pressure sensor device, according to an embodiment of the present disclosure.

FIG. 1 shows a pressure sensor device 1, comprising a pressure detection structure 2 provided in a first die 4 of semiconductor material, in particular silicon.

The first die 4 has a top surface 4a and a bottom surface 4b, with extension parallel to a horizontal plane xy and opposite to each other along a vertical axis z, orthogonal to the aforementioned horizontal plane xy.

The pressure detection structure 2 comprises a first membrane 6, provided at the top surface 4a, arranged above a first cavity 7, buried within the die 4; in other words, the first membrane 6 is interposed between the underlying first cavity 7 and the aforementioned top surface 4a of the first die 4.

Detection elements 8, in particular piezoresistors, are arranged within the first membrane 6, configured to allow detection of deformations of the first membrane 6 due to impinging pressure waves.

The pressure sensor device 1 further comprises a processing circuit 10, implemented as an ASIC, integrated in a second die 12 of semiconductor material, in particular silicon, having a respective top surface 12a and a respective bottom surface 12b.

In the illustrated embodiment, the aforementioned first and second dies 4, 12 are arranged stacked, with the top surface 12a of the second die 12 coupled, by a first bonding region 13, to the bottom surface 4b of the first die 4.

First bonding wires 15 electrically connect first pads 16 carried by the top surface 4a of the first die 4, to respective second pads 17 carried by the top surface 12a of the second die 12, to allow the electrical connection between the pressure detection structure 2 (and the corresponding detection elements 8) and the processing circuit 10.

In particular, the processing circuit 10 is configured to generate, as a function of electrical signals provided by the detection elements 8, a pressure signal, indicative of the pressure value impinging on the first membrane 6.

The pressure sensor device 1 further comprises a package 20, configured to internally accommodate the aforementioned stack formed by the pressure detection structure 2 and the associated processing circuit 10, in an impermeable or hermetic manner.

The package 20 comprises a base structure 21 and a body structure 22, arranged on the base structure 21 and having a cup shape and internally defining an housing cavity 23, in which the pressure detection structure 2 and the processing circuit 10 are arranged.

In particular, the bottom surface 12b of the second die 12 is coupled, by a second bonding region 24, to an internal surface 21a of the base structure 21, facing the aforementioned housing cavity 23.

Second bonding wires 25 electrically connect third pads 26 carried by the top surface 12a of the second die 12 to respective fourth pads 27 carried by the internal surface 21a of the base structure 21, to allow the electrical connection between the processing circuit 10 and the external environment outside of the package 20.

To this end, through vias 28, electrically conductive, traverse the entire thickness of the base structure 21 and connect the aforementioned fourth pads 27 to connection elements 29, for example provided in the form of respective pads (as in the illustrated example) or of conductive bumps, carried by an external surface 21b of the same base structure 21, arranged in contact with the external environment.

In a manner not illustrated, these connection elements 29 may be contacted from outside of the package 20, for example for transmitting the pressure signal to a control and management unit of an electronic apparatus, in which the pressure sensor device 1 is incorporated.

The aforementioned body structure 22 has upwardly (at an end opposite to the base structure 21) an access opening 30, in fluidic communication with the housing cavity 23, for allowing introduction within the package 20 of pressure waves to be detected.

A coating material 32 fills almost entirely the aforementioned housing cavity 23 and entirely covers and coats the aforementioned stack formed by the pressure detection structure 2 and the associated processing circuit 10, to ensure impermeability thereof; this coating material (potting gel) 32 is in particular a coating gel, for example a silicone gel.

Conversely, a top portion 23' of the housing cavity 23 remains free from the aforementioned coating material 32 and therefore contains air in fluidic communication with the external environment through the access opening 30.

According to a particular aspect of the present disclosure, the pressure sensor device 1 further comprises a piezoelectric transduction structure 35, of ultrasonic type, so-called PMUT (Piezoelectric Micromachined Ultrasonic Transducer).

This piezoelectric transduction structure 35 is integrated in the same first die 4 wherein the pressure detection structure 2 is made; in particular, the first die 4 therefore comprises a first portion 4', wherein the pressure detection structure 2 is integrated, and a second portion 4", separate and distinct from the first portion 4', wherein the piezoelectric transduction structure 35 is integrated. In detail, the piezoelectric transduction structure 35 comprises a second membrane 36, provided at the top surface 4a of the die 4, arranged above a second cavity 37, buried within the die 4; in other words, the second membrane 36 is interposed between the underlying second cavity 37 and the aforementioned top surface 4a of the first die 4.

The second membrane 36 has for example a thickness along the vertical axis z equal to 5 μm and a substantially circular extension in the horizontal plane xy with a diameter equal to 120 μm, while the second cavity 37 has a thickness equal to 3 μm along the same vertical axis z.

Above the second membrane 36 a piezoelectric stack 38 is provided, formed by a bottom electrode 38a, a piezoelectric material region 38b and a top electrode 38c (the piezoelectric material region 38b being interposed between the bottom electrode 38a and the top electrode 38b and the same bottom electrode 38a being arranged on the top surface 4a of the first die 4, with extension substantially corresponding to the underlying second membrane 36).

In a manner not shown in detail, suitable electrical connection tracks connect the aforementioned bottom electrode 38a and top electrode 38b to respective of the first pads 16 carried by the top surface 4a of the first die 4, for the connection, through respective of the second pads 17 carried by the top surface 12a of the second die 12, to the processing circuit 10.

In particular, the processing circuit 10 comprises (as schematically illustrated in the aforementioned FIG. 1) a driving module 39a for the piezoelectric transduction structure 35, for providing suitable biasing signals to the aforementioned bottom electrode 38a and top electrode 38b to cause the deformation of the second membrane 36 and generate detection acoustic waves (in particular ultrasound waves, for example with a resonance frequency around 5 MHz); and also a detection module 39b, to read the electrical signals transduced by the same bottom electrode 38a and top electrode 38b when the second membrane 36 is deformed by impinging acoustic waves, due to the echo of the aforementioned detection acoustic waves.

During operation, the aforementioned piezoelectric transduction structure 35 allows detecting the presence of foreign material within the package 20, in particular interposed between the coating material 32 and the access opening 30, in the aforementioned top portion 23' of the housing cavity 23, by detecting the acoustic impedance change associated with the presence of the same coating material 32.

The echo produced by the detection acoustic waves generated by the piezoelectric transduction structure 35 is detected by the same piezoelectric transduction structure 35 (and for example processed by the aforementioned detection module 39b of the processing circuit 10). In particular, the detected signal has characteristics (for example in terms of amplitude and of a corresponding time trend) which are affected by the presence of the aforementioned foreign material, which in fact causes an acoustic impedance change and a different reflection pattern of the detection acoustic waves. For example, the detection module 39b is configured to determine the amplitude of peaks in the detected signal and/or the time position of the same peaks with respect to an instant of generation of the aforementioned detection acoustic waves.

Figure 2:
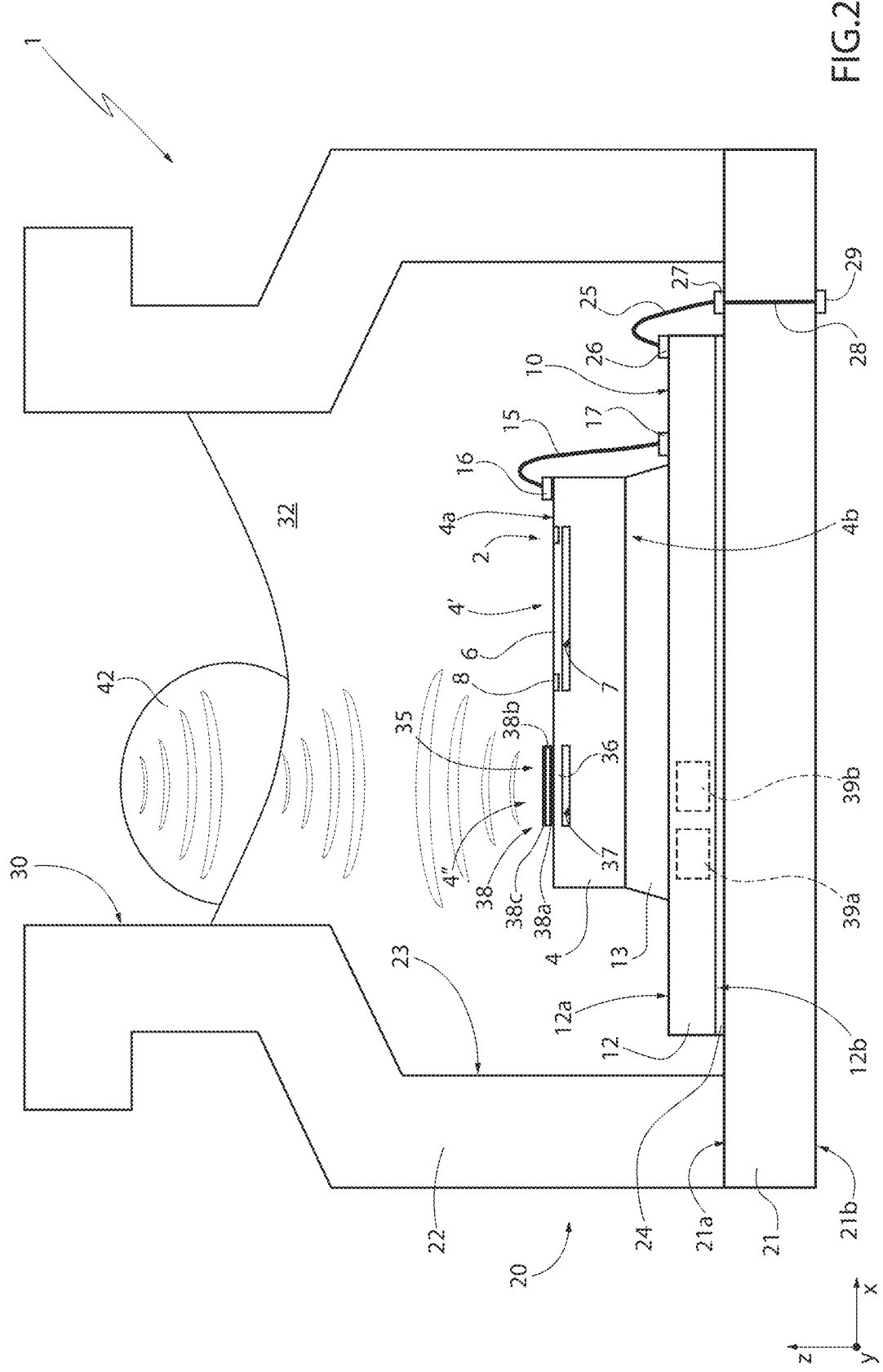
FIG. 2 illustrates a schematic cross-section of the pressure sensor device of FIG. 1, in the presence of foreign material within the corresponding package.

FIG. 2 schematically shows the presence of a foreign material region 42, in the example having a localized arrangement (with variable dimensions) above the same coating material 32; this foreign material region 42 is in the example a drop (or a certain amount) of residual water which is present in the top portion 23' of the housing cavity 23 and has not yet evaporated.

However, it is highlighted that this foreign material region 42 may alternatively be of a different liquid or include one or more solid particles of contaminating material.

Figure 3A:
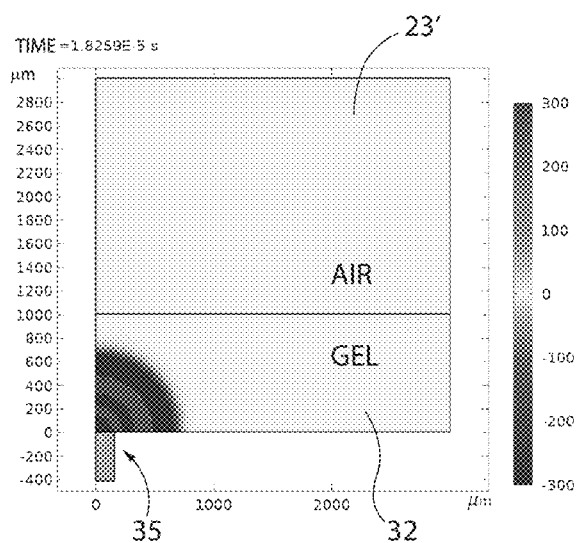
FIGS. 3A-3C are plots relating to a simulation of deformations of a membrane of the device of FIG. 1, in different operating conditions.
Figure 3B:
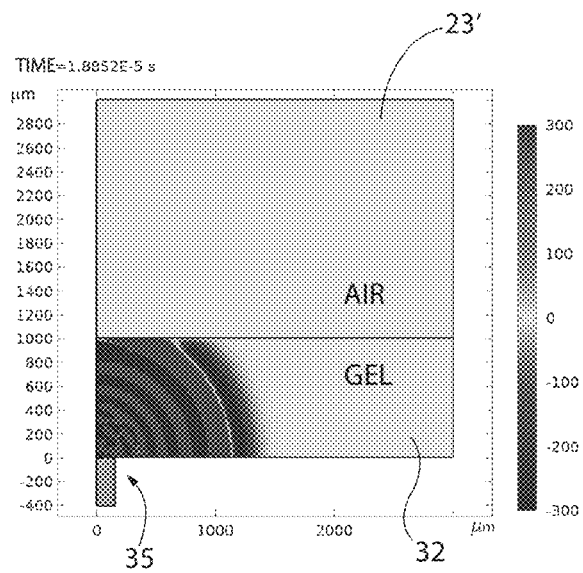
Figure 3C:
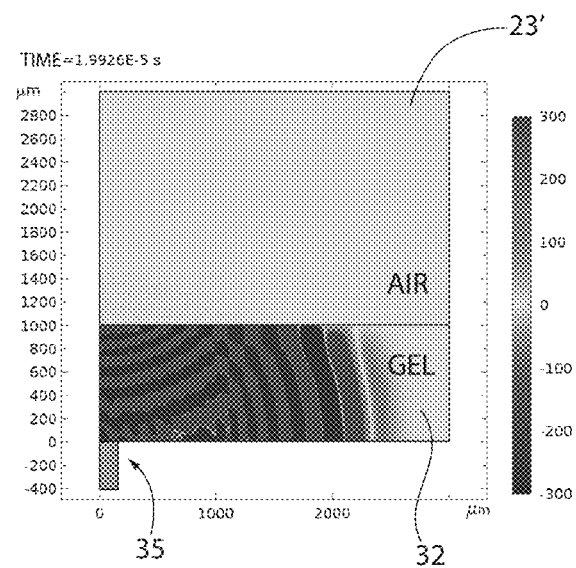

FIGS. 3A-3C show, schematically, the simulated trend of the detection acoustic waves due to deformation of the second membrane 36 of the piezoelectric transduction structure 35, in the absence of the aforementioned foreign material region 42, in three different time instants from the generation of the same detection acoustic waves by the piezoelectric transduction structure 35.

In particular, FIG. 3C highlights the reflection due to the acoustic impedance change at the interface between the coating material 32 and the air in the top portion 23' of the housing cavity 23, at the access opening 30 of the package 20.

Figure 4A:
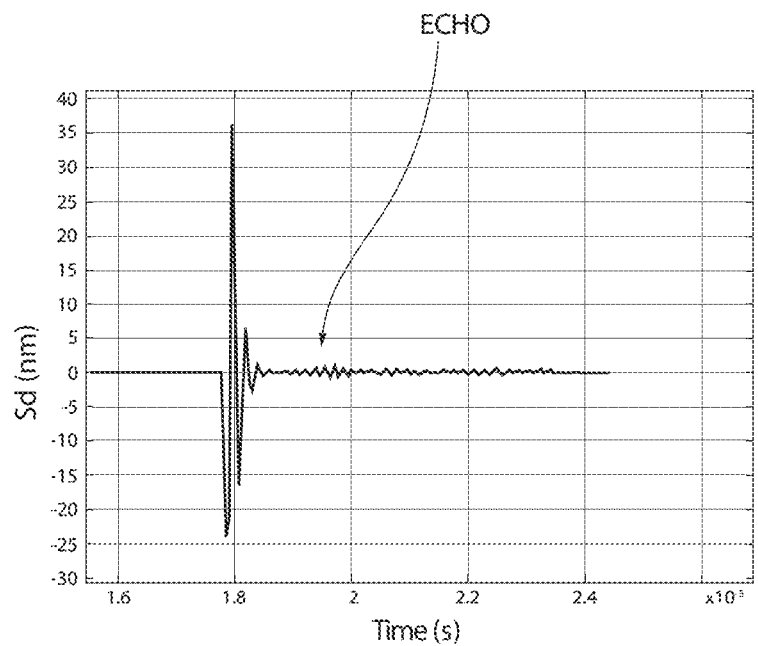
FIGS. 4A-4B are electrical signals relating to the operation of the device of FIG. 1.

FIG. 4A shows the actual trend of the vertical displacement (along the vertical axis z), indicated by Sa, of the surface of the second membrane 36, where it is possible to identify an amplitude peak due to the actuation of the piezoelectric stack 38 and subsequently the echo due to reflection at the interface between the coating material 32 and air.

Figure 4B:
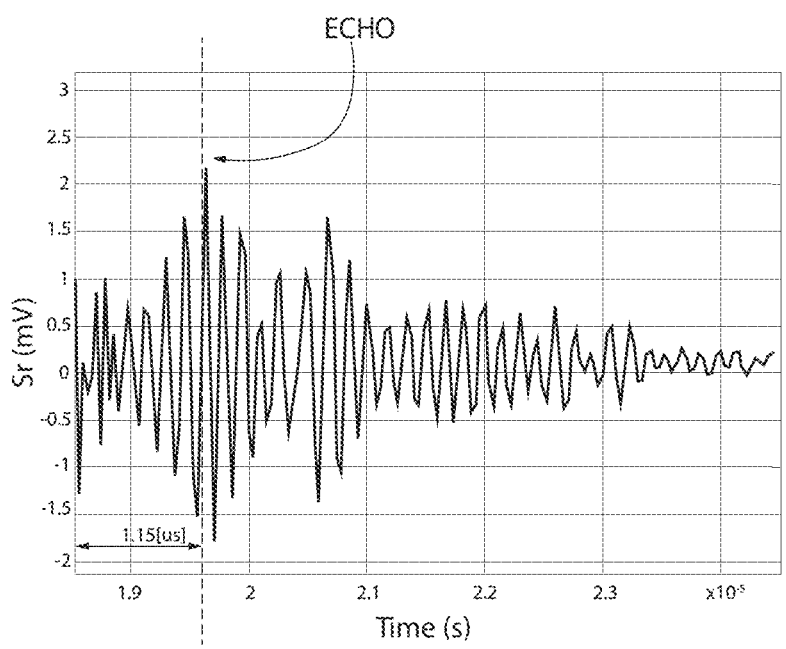

FIG. 4B shows the corresponding trend of the detection signal, indicated by $S_r$, as a function of the response of the piezoelectric detection structure 35 upon receiving the aforementioned echo, in the example having a maximum amplitude peak after a time interval of 1.15 μs subsequently to actuation of the piezoelectric stack 38.

Figure 5A:
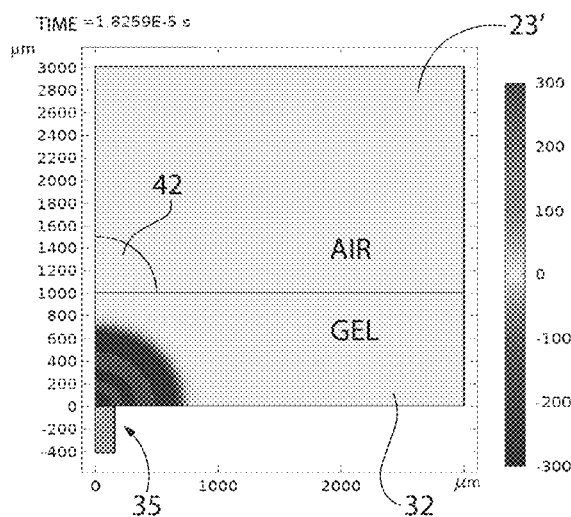
FIGS. 5A-5C are plots relating to a simulation of deformations of a membrane of the device of FIG. 2, in different operating conditions.
Figure 5B:
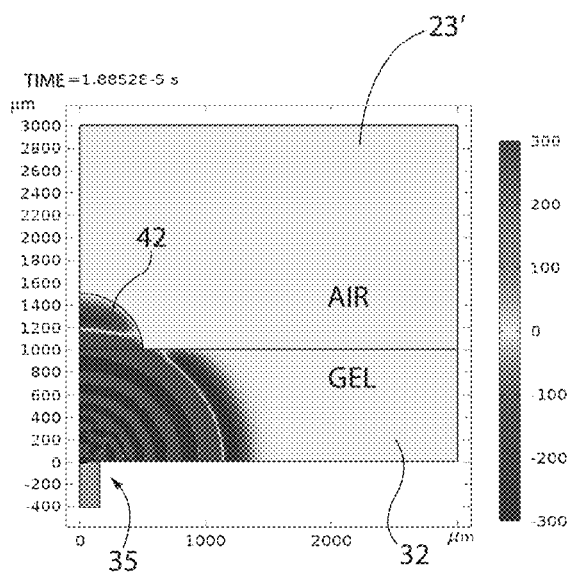
Figure 5C:
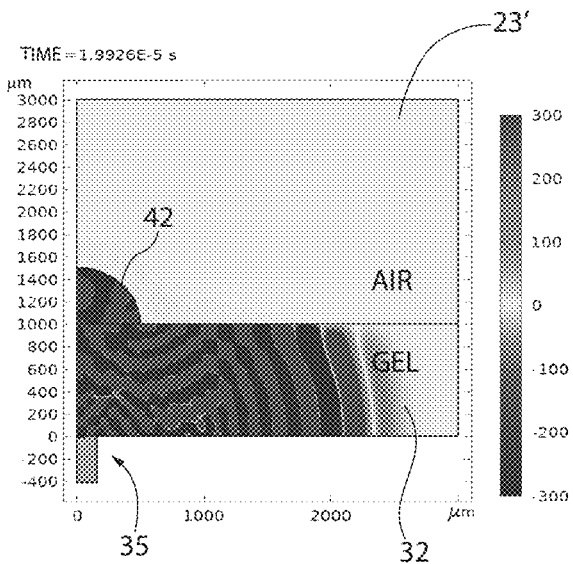

FIGS. 5A-5C show a similar simulation relating to the trend of the detection acoustic waves due to the deformation of the second membrane 36 of the piezoelectric transduction structure 35, this time in the presence of the aforementioned foreign material region 42, in the three different time instants from generation of the detection acoustic waves by the same piezoelectric transduction structure 35.

In this case two reflections occur, due to the first acoustic impedance change at the interface between the coating material 32 and the foreign material region 42 and to the second acoustic impedance change between the same foreign material region 42 and the air, at the access opening 30 of the package 20.

Figure 6A:
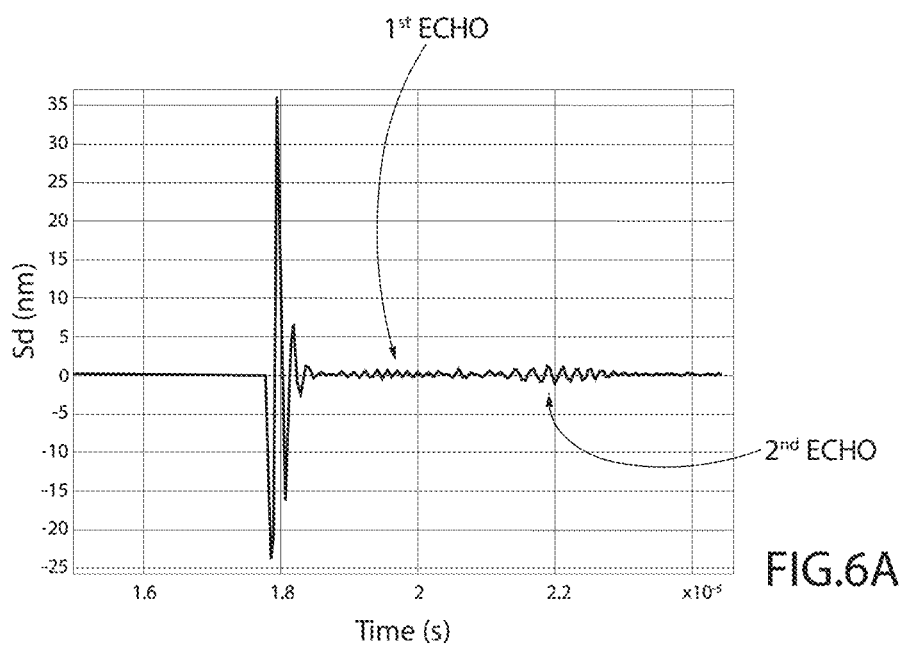
FIGS. 6A-6B are electrical signals relating to the operation of the device of FIG. 2.

FIG. 6A shows the corresponding trend of the vertical displacement Sa of the surface of the second membrane 36, wherein it is possible to identify the peak due to actuation of the piezoelectric stack 38 and subsequently a first deformation linked to the first echo due to the first reflection at the interface between the coating material 32 and the foreign material region 42 and subsequently a second deformation linked to the second echo due to the second reflection between the coating material 32 and the air.

Figure 6B:
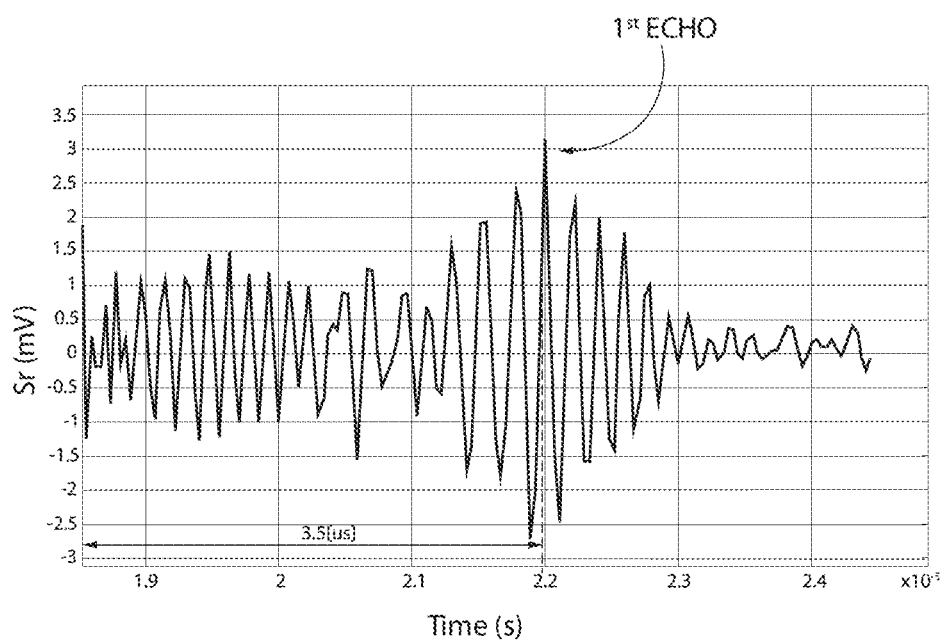

FIG. 6B shows the corresponding trend of the detection signal $S_r$, upon receiving the aforementioned echoes. The maximum peak of the detection signal occurs in the example after a time interval equal to 3.5 μs following the actuation of the piezoelectric stack 38, due to the aforementioned first echo, therefore with a greater time delay with respect to the situation of absence of the foreign material region 42 (see the corresponding FIG. 4B).

Figure 7:
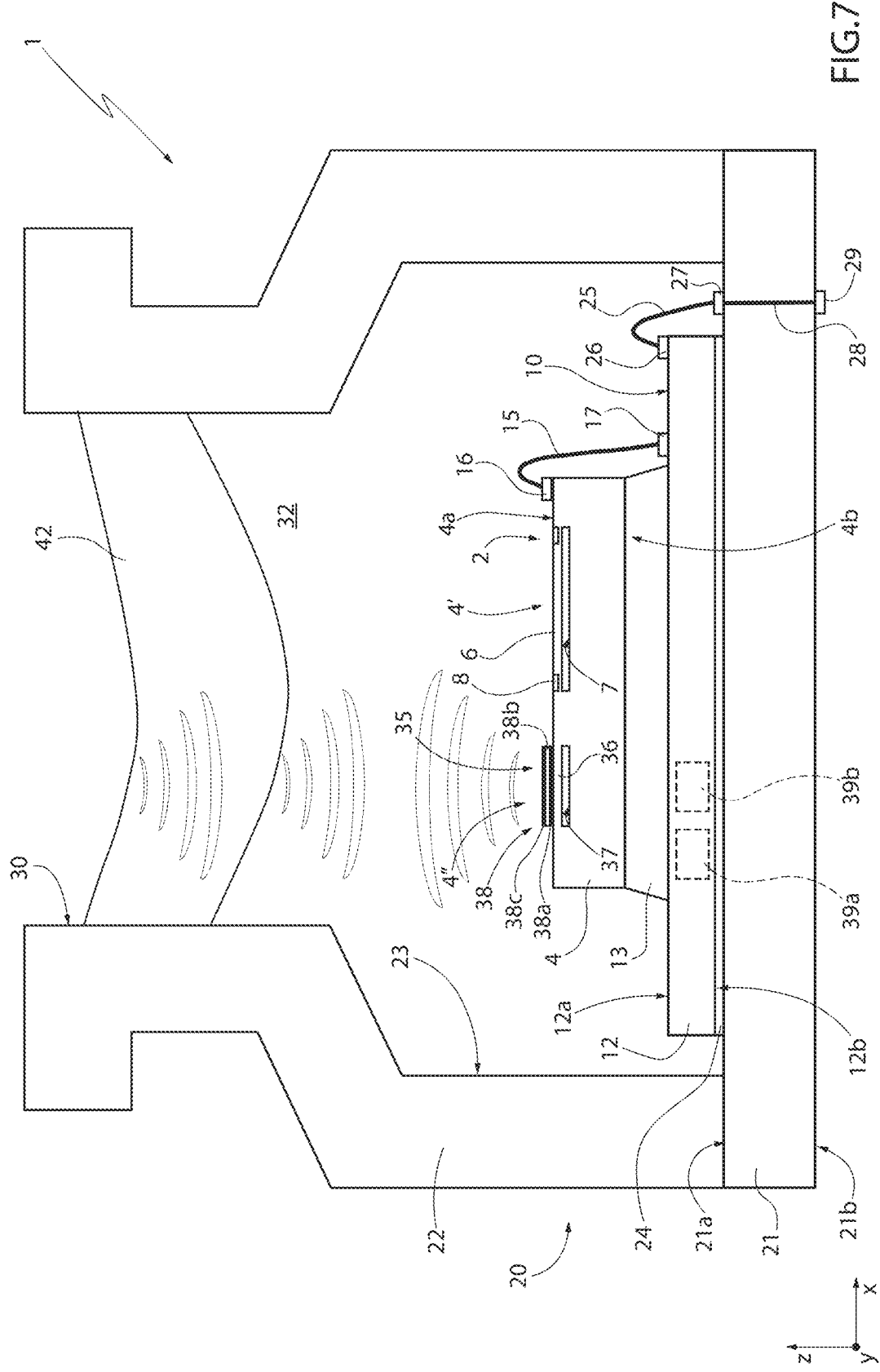
FIG. 7 illustrates a schematic cross-section of the pressure sensor device of FIG. 1, in the presence of a different configuration of the foreign material within the corresponding package.

In general, it is apparent that the characteristics and the trend of the detection signal $S_r$ are indicative of the presence of the aforementioned foreign material region 42 within the package 20. As illustrated in FIG. 7, the aforementioned foreign material region 42 may also be a continuous region of material (for example of water or different liquid) which is interposed between the coating material 32 and the access opening 30, throughout the extension of the same access opening 30 in the horizontal plane xy. The thickness of this foreign material region 42 may vary;

moreover, the same foreign material region 42 may possibly also be present outside the access opening 30, in case, for example, of immersion in water (or in another fluid) of the electronic apparatus incorporating the pressure sensor device 1.

Figure 8:
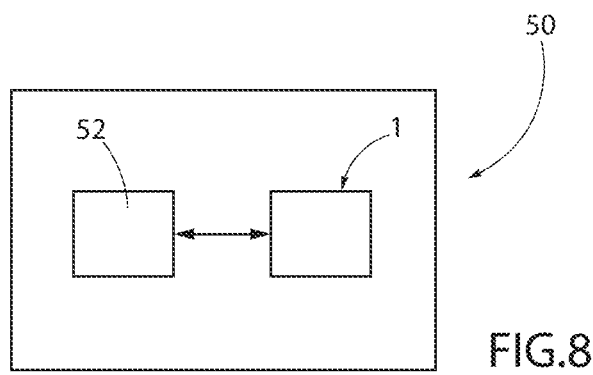
FIG. 8 is a schematic block diagram of an electronic apparatus, in which the pressure sensor device of FIG. 1 may be used.

FIG. 8 schematically illustrates an electronic apparatus 50, in particular of a wearable type (for example a smartband or smartwatch) which includes the pressure sensor device 1 previously described.

The electronic apparatus 50 comprises a main controller 52 (a microcontroller, a microprocessor or a similar digital processing unit), coupled to the processing circuit 10 of the pressure sensor device 1, in order to receive information relating to the pressure detection and also relating to the presence of any foreign material detected within the package 20.

The main controller 52, as a function of the detection of the aforementioned foreign material, may carry out specific actions, for example (in case of water) waiting for a time interval suitable for the evaporation before carrying out a pattern recognition of the pressure signal provided by the same pressure sensor device 1, or generating an alarm signal associated with the presence of the same foreign material.

The advantages provided by the present disclosure are clear from the previous description.

In any case, it is highlighted that integration of the piezoelectric detection structure 35 within the package 20 of the pressure sensor device 1 allows the detection of foreign material within the same package 20, with a high accuracy and with limited energy consumption and additional area occupation.

Moreover, the detection signal provided by the aforementioned piezoelectric detection structure 35 may be used to assist in the determination of entry into the water of the electronic apparatus 50 wherein the pressure sensor device 1 is used, allowing the number of false detections (false positives) to be eliminated or in any case strongly reduced.

Finally, variations and modifications may be applied to the present disclosure, without thereby departing from the scope defined by the claims.

In particular, in a manner not illustrated, a plurality of piezoelectric detection structures 35 might be integrated in the first die 4, arranged in a matrix or array at the top surface 4a of the same first die 4.

For example, a suitable arrangement of piezoelectric detection structures 35 might allow scanning of the entire access cavity 30, or in any case directing the generated detection acoustic waves in any desired manner.

Moreover, it is highlighted that processing of the signal associated with the detection of the echo by the piezoelectric detection structure 35 might be performed externally to the pressure sensor device 1, instead of by the processing circuit 10, for example by the aforementioned main controller 52 of the electronic apparatus 50.

Furthermore, it is highlighted that the pressure sensor device 1 may have various fields of use, for example for industrial or automotive applications, in general in any application wherein hermetic pressure detection is required and the possibility may occur for contaminating materials (such as dust, fluids or chemicals) to enter the package 20 of the same pressure sensor device 1.

In at least one embodiment of the present disclosure, a pressure sensor device (1) may be summarized as including a pressure detection structure (2) provided in a first die (4) of semiconductor material; a package (20), configured to internally accommodate said pressure detection structure (2) in an impermeable manner, the package (20) including a base structure (21) and a body structure (22), arranged on the base structure (21), having an access opening (30) in contact with an external environment and internally defining a housing cavity (23), in which said first die (4) is arranged covered by a coating material (32), including, accommodated in said housing cavity (23), a piezoelectric transduction structure (35), of a ultrasonic type, configured to allow detection of foreign material (42) on said coating material (32) within said package (20).

Said piezoelectric transduction structure (35) may be integrated in said first die (4), which may include a first portion (4'), wherein the pressure detection structure (2) may be integrated, and a second portion (4"), separate and distinct from the first portion (4'), wherein the piezoelectric transduction structure (35) may be integrated.

Said piezoelectric transduction structure (35) may include at least one membrane (36), provided at a top surface (4a) of the first die (4), arranged above a cavity (37), buried within the first die (4); a piezoelectric stack (38) formed above the membrane (36), made by a bottom electrode (38a), a piezoelectric material region (38b) and a top electrode (38c), the piezoelectric material region (38b) being interposed between the bottom electrode (38a) and the top electrode (38b) and the bottom electrode (38a) being arranged on the top surface (4a) of the first die (4).

Said pressure detection structure (2) may include a respective membrane (6), provided at the top surface (4a) of said first die (4), arranged above a respective cavity (7), buried within the first die (4); and detection elements (8), of piezoresistive type, arranged in said respective membrane (6) and configured to allow detection of deformations of the respective membrane (6) due to impinging pressure waves.

The device according may further include a processing circuit (10), implemented as an ASIC—Application Specific Integrated Circuit, integrated in a second die (12) of semiconductor material, accommodated in said housing cavity (23) of said package (20); the processing circuit (10) may include a driving module (39a) for driving said piezoelectric transduction structure (35), configured to provide biasing signals to said bottom electrode (38a) and top electrode (38b) to deform the membrane (36) and generate ultrasound detection acoustic waves; and a detection module (39b), configured to read electrical signals transduced by the piezoelectric transduction structure (35), when the membrane (36) is deformed by the echo due to reflection of said detection acoustic waves.

Said detection module (39b) may be configured to detect the presence of said foreign material (42) in a top portion (23') of the housing cavity (23) of the package (20), interposed between the coating material (32) and the access opening (30), by processing characteristics of a signal detected through said piezoelectric detection structure (35) due to said echo.

The detection module (39b) may be configured to determine an acoustic impedance change associated with said foreign material.

Said detection module (39b) may be configured to: determine the amplitude of peaks in the detected signal and/or the time position of the peaks with respect to an instant of generation of said detection acoustic waves; and may determine the presence of said foreign material (42) as a function of said amplitude of peaks and/or the time position of said peaks.

Said first and second dies (4, 12) may be arranged stacked, with a top surface (12*a*) of the second die (12) coupled, by a bonding region (13), to the bottom surface (4*b*) of the first die (4).

Said piezoelectric transduction structure (35) may include a plurality of membranes (36) arranged to form a matrix or array at the top surface (4*a*) of said first die (4) above respective cavities (37) and respective piezoelectric stacks (38) formed above the membranes (36).

Said coating material (32) may fill said housing cavity (23) except a corresponding top portion (23'), which may be in fluidic communication with the external environment through the access opening (30); and said foreign material (42) may be arranged in said top portion (23') of the housing cavity (23).

Said foreign material (42) may include an amount of liquid and/or solid particles of contaminating material.

Said liquid may be water.

In at least one embodiment of the present disclosure, an electronic apparatus (50) may be summarized as including a pressure sensor device (1) and a main controller (52) coupled to said pressure sensor device (1) and configured to perform and/or activate specific actions in response to the detection of said foreign material (42).

The apparatus may be of a wearable type, for applications in water or underwater.

In at least one embodiment of the present disclosure, a method for detecting foreign material (42), may be summarized as including a pressure sensor device (1) provided with a pressure detection structure (2) made in a first die (4) of semiconductor material; a package (20), configured to internally accommodate said pressure detection structure (2) in an impermeable manner, said package (20) including a base structure (21) and a body structure (22) arranged on the base structure (21), having an access opening (30) in contact with an external environment and internally defining a housing cavity (23), in which said first die (4) is arranged covered with a coating material (32), including determining the presence of said foreign material (42) above said coating material (32) and within said package (20), wherein determining includes generating, by a piezoelectric transduction structure (35), operating in the ultrasounds and accommodated in said housing cavity (23), ultrasound detection acoustic waves; and processing an electrical signal detected through said piezoelectric transduction structure (35), due to an echo associated with the reflection of said detection acoustic waves.

Processing may include determining an acoustic impedance change associated with said foreign material.

The method may include determining the amplitude of peaks in the detected signal and/or the time position of the peaks with respect to an instant of generation of said detection acoustic waves; and determining the presence of said foreign material (42) as a function of said amplitude of peaks and/or the time position of said peaks.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a first die including:
    a pressure detection structure; and
    an ultrasonic piezoelectric transduction structure;
a package contains the first die, the package including a base structure and a body structure on the base structure, the package having an access opening in fluid communication with an external environment, the package internally defining a housing cavity in which the first die is arranged and in which the first die is covered by a coating material within the package and in the housing cavity,
wherein the piezoelectric transduction structure of the first die is configured to allow detection of foreign material on the coating material.

2. The device according to claim 1, wherein the first die further includes:
a first portion at which the piezoelectric transduction structure is integrated; and
a second portion separate and distinct from the first portion at which the piezoelectric transduction structure is integrated.

3. The device according to claim 2, wherein the piezoelectric transduction structure includes:
a first membrane at a surface of the first die, arranged over a first cavity buried within the first die; and
a piezoelectric stack formed over the first membrane, the piezoelectric stack includes a first electrode, a piezoelectric material region and a second electrode, the piezoelectric material region being interposed between the first electrode and the second electrode and the first electrode being arranged on the surface of the first die.

4. The device according to claim 3, wherein said pressure detection structure includes:
a second membrane at the surface of the first die, arranged over a second cavity buried within the first die; and
detection elements of a piezoresistive type arranged in the second membrane and configured to allow detection of deformations of the second membrane due to impinging pressure waves.

5. The device according to claim 3, further comprising:
a second die including processing circuitry, implemented as an ASIC (Application Specific Integrated Circuit), and the second die being in the housing cavity of the package, and
wherein the processing circuit includes:
    a driving module for driving the piezoelectric transduction structure, configured to provide biasing signals to the first electrode and to the second electrode to deform the first membrane and generate ultrasound detection acoustic waves; and
    a detection module configured to read electrical signals transduced by the piezoelectric transduction structure when the first membrane is deformed by an echo due to reflection of the detection acoustic waves.

6. The device according to claim 5, wherein the detection module is configured to detect a presence of the foreign material in a portion of the housing cavity of the package interposed between the coating material and the access opening by processing characteristics of a detected signal detected through the piezoelectric transduction structure due to the echo.

7. The device according to claim 6, wherein the detection module is configured to determine an acoustic impedance change associated with said foreign material.

8. The device according to claim 6, wherein the detection module is configured to:
determine at least one of the following of an amplitude of peaks in the detected signal and time position of the peaks with respect to an instant of generation of the detection acoustic waves; and
determine the presence of the foreign material as a function of at least one of the of the following of the amplitude of the peaks the time position of the peaks.

9. The device according to claim 5, wherein the first and second dies are stacked, with a first surface of the second die coupled to a second surface of the first die by a bonding region.

10. The device according to claim 1, wherein the piezoelectric transduction structure includes:
a plurality of cavities in the first die;
a plurality of membranes arranged in a matrix or array at a surface of the first die, the plurality of membranes overlap the plurality of cavities; and
a plurality of piezoelectric stacks at the surface of the first die, the plurality of piezoelectric stacks overlap the plurality of membranes.

11. The device according to claim 1, wherein:
the coating material fills the housing cavity except a portion of the housing cavity, the portion of the housing cavity is in fluidic communication with the external environment through the access opening.

12. A method, comprising:
detecting foreign material with a pressure sensor device, the pressure sensor device including:
a first die including:
a pressure detection structure; and
a piezoelectric transduction structure of an ultrasonic type;
a package contains the first die, the package including a base structure and a body structure on the base structure, the package having an access opening in fluid communication with an external environment and internally defining a housing cavity in which the first die is arranged and in which the first die is covered with a coating material,
wherein detecting the foreign material with the pressure sensor device includes:
determining the presence of the foreign material over the coating material and within the package, determining the presence of the foreign material over the coating material and within the package including:
generating ultrasounds detection acoustic waves with the piezoelectric transduction structure; and
processing an electrical signal detected through the piezoelectric transduction structure due to an echo associated with a reflection of the detection acoustic waves.

13. The method according to claim 12, wherein processing the electrical signal detected through the piezoelectric transduction structure includes determining an acoustic impedance change associated with said foreign material.

14. The method according to claim 13, comprising determining the amplitude of peaks in the detected signal and/or time position of the peaks with respect to an instant of generation of said detection acoustic waves; and determining the presence of said foreign material as a function of the amplitude of peaks and/or the time position of said peaks.

15. A device, comprising:
a base structure including a surface;
a body structure coupled on the surface of the base structure, the body structure includes an access opening;
a housing cavity defined by the base structure and the body structure;
a first die within the housing cavity and on the surface of the base structure;
a second die within the housing cavity and stacked on the second die, the second die including:
a piezoelectric detection structure; and
a piezoelectric transduction structure;
a coating material in the housing cavity covers the first die and covers the second die, the coating material including a surface exposed by the access opening.

16. The device of claim 15, wherein the piezoelectric transduction structure is of an ultrasonic type.

17. The device of claim 15, wherein the second die further includes a surface facing way from the first die, the piezoelectric detection structure is at the surface of the second die, and the piezoelectric transduction structure is at the surface of the second die.

18. The device of claim 15, wherein the piezoelectric transduction structure includes:
a first cavity within the first die;
a first membrane extends across the first cavity; and
a piezoelectric stacked structure on the membrane.

19. The device of claim 18, wherein the piezoelectric stacked structure includes a first electrode on the membrane, a piezoelectric layer on the first electrode, and a second electrode on the piezoelectric layer.

20. The device of claim 19, wherein the piezoelectric detection structure includes:
a second cavity in the first die and spaced apart from the first cavity;
a second membrane extends across the second cavity; and
a detection element in the first die and that overlaps the second membrane.

* * * * *